(12) United States Patent
Kang et al.

(10) Patent No.: US 10,146,583 B2
(45) Date of Patent: Dec. 4, 2018

(54) SYSTEM AND METHOD FOR DYNAMICALLY MANAGING COMPUTE AND I/O RESOURCES IN DATA PROCESSING SYSTEMS

(71) Applicant: Samsung Electronics Co., Ltd., Suwon-si, Gyeonggi-do (KR)

(72) Inventors: Yangwook Kang, San Jose, CA (US); Yang Seok Ki, Palo Alto, CA (US)

(73) Assignee: Samsung Electronics Co., Ltd. (KR)

( * ) Notice: Subject to any disclaimer, the term of this patent is extended or adjusted under 35 U.S.C. 154(b) by 82 days.

(21) Appl. No.: 15/289,021

(22) Filed: Oct. 7, 2016

(65) Prior Publication Data

US 2018/0046512 A1 Feb. 15, 2018

Related U.S. Application Data

(60) Provisional application No. 62/373,901, filed on Aug. 11, 2016.

(51) Int. Cl.
*G06F 9/46* (2006.01)
*G06F 9/50* (2006.01)

(52) U.S. Cl.
CPC .......... *G06F 9/5027* (2013.01); *G06F 9/5066* (2013.01); *G06F 2209/5011* (2013.01); *G06F 2209/5018* (2013.01)

(58) Field of Classification Search
CPC ........................................................ G06F 9/52
USPC ........................................................ 718/104
See application file for complete search history.

(56) References Cited

U.S. PATENT DOCUMENTS

| | | | | |
|---|---|---|---|---|
| 7,783,798 B1* | 8/2010 | Misra | ..................... | G06F 1/3209 710/60 |
| 8,813,073 B2* | 8/2014 | Kwon | ................... | G06F 9/5088 718/1 |
| 8,904,399 B2* | 12/2014 | Thomson | .............. | G06F 9/4881 718/103 |
| 9,032,411 B2* | 5/2015 | Arndt | ..................... | G06F 9/4881 718/103 |
| 9,086,925 B2* | 7/2015 | Li | ......................... | G06F 9/5044 |
| 9,141,422 B2* | 9/2015 | Toub | ..................... | G06F 9/4843 |

(Continued)

OTHER PUBLICATIONS

Bhatt-2009.pdf "https://nirajrules.wordpress.com/2009/09/28/networker-threads-io-threads-and-asynchronous-programming/", p. 1-4.*

(Continued)

*Primary Examiner* — Mehran Kamran
(74) *Attorney, Agent, or Firm* — Innovation Counsel LLP

(57) ABSTRACT

A method for managing compute and I/O tasks in a data processing system includes: providing a thread pool including a plurality of thread groups, each thread group including one or more threads; providing a CPU pool including a plurality of CPU groups, each CPU group including one or more CPU cores; receiving a plurality of tasks comprising I/O tasks and compute tasks; mapping each of the plurality of tasks to at least one thread group in the thread pool; and mapping each of the plurality of thread groups in the thread pool to at least one CPU group in the CPU pool. The mappings between the plurality of tasks and the plurality of thread groups and between the plurality of thread groups and the plurality of CPU groups dynamically change based on performance variables.

18 Claims, 9 Drawing Sheets

(56) References Cited

U.S. PATENT DOCUMENTS

| | | | |
|---|---|---|---|
| 9,250,953 B2* | 2/2016 | Kipp | G06F 9/46 |
| 9,354,931 B1* | 5/2016 | Ryoo | G06F 9/5061 |
| 9,665,398 B2* | 5/2017 | Magee | G06F 9/4881 |
| 2003/0061264 A1* | 3/2003 | Benhase | G06F 9/505 |
| | | | 718/105 |
| 2007/0169001 A1* | 7/2007 | Raghunath | G06F 9/44547 |
| | | | 717/130 |
| 2009/0150650 A1* | 6/2009 | Van der Hoeven | G06F 9/5066 |
| | | | 712/28 |
| 2009/0183167 A1* | 7/2009 | Kupferschmidt | G06F 9/5027 |
| | | | 718/104 |
| 2010/0257538 A1* | 10/2010 | Zhao | G06F 9/4881 |
| | | | 718/106 |
| 2013/0191837 A1* | 7/2013 | Abeles | G06F 9/5011 |
| | | | 718/104 |
| 2014/0068621 A1* | 3/2014 | Sitaraman | G06F 9/505 |
| | | | 718/102 |
| 2014/0143781 A1* | 5/2014 | Yao | G06F 9/4856 |
| | | | 718/100 |
| 2014/0189297 A1* | 7/2014 | Narvaez | G06F 9/45558 |
| | | | 712/29 |
| 2014/0208331 A1* | 7/2014 | Li | G06F 9/5044 |
| | | | 718/105 |
| 2015/0135183 A1* | 5/2015 | Kipp | G06F 9/46 |
| | | | 718/103 |
| 2015/0324234 A1* | 11/2015 | Chang | G06F 9/5033 |
| | | | 718/104 |
| 2016/0204985 A1* | 7/2016 | Mann | H04W 4/24 |
| | | | 709/223 |
| 2016/0350157 A1* | 12/2016 | Necas | G06F 9/5038 |
| 2017/0103031 A1* | 4/2017 | Liu | G06F 13/22 |

OTHER PUBLICATIONS

Berry-2015.pdf "https://sqlperformance.com/2015/05/io-subsystem/analyzing-io-performance-for-sql-server", p. 1-8.*

Prasad-2012.pdf "https://www.toadworld.com/platforms/sql-server/b/weblog/archive/2012/04/23/sql-server-affinity-mask-setting", p. 1-3.*

* cited by examiner

SYSTEM AND METHOD FOR DYNAMICALLY MANAGING COMPUTE AND I/O RESOURCES IN DATA PROCESSING SYSTEMS

CROSS-REFERENCE TO RELATED APPLICATION(S)

This application claims the benefits of and priority to U.S. Provisional Patent Application Ser. No. 62/373,901 filed Aug. 11, 2016, the disclosure of which is incorporated herein by reference in its entirety.

TECHNICAL FIELD

The present disclosure relates generally to data processing systems, more particularly, to a system and method for dynamically managing compute and I/O resources in a data processing system.

BACKGROUND

System resource management schemes play an important role in determining the performance and latency characteristics of a data processing system. Most data processing engines use either an on-demand policy or a static mapping policy as their backend resource management infrastructure. The on-demand resource management policy, often referred to as a thread-pool, is used in many data-driven and compute-intensive engines such as Hadoop and Ceph. The static resource management is a basis of most commercial, high performance operating systems (OSes) for data storage systems or data processing engines such as SCYLLA.

The on-demand policy is good at utilizing compute resources (e.g., a central process unit (CPU)) based on a fair and time-sharing scheduler of an operating system when executing processes or threads. However, the on-demand policy often can create a high CPU contention between input/output (I/O) and compute tasks resulting in a longer latency. The static mapping policy can alleviate the CPU contention by assigning I/O and compute tasks to different physical cores of the CPU. While the static mapping policy can enjoy a shorter latency, the static mapping policy would not be ideal when the I/O workload is unpredictable, or there are not sufficient requests for the pre-assigned threads and compute resources. Insufficient requests to a pre-assigned task can cause the compute resources to idle, leading to a sub-optimal performance.

SUMMARY

According to one embodiment, a method includes: providing a thread pool including a plurality of thread groups, each thread group including one or more threads; providing a CPU pool including a plurality of CPU groups, each CPU group including one or more CPU cores; receiving a plurality of tasks including I/O tasks and compute tasks; mapping each of the plurality of tasks to at least one thread group in the thread pool; and mapping each of the plurality of thread groups in the thread pool to at least one CPU group in the CPU pool. The mappings between the plurality of tasks and the plurality of thread groups and between the plurality of thread groups and the plurality of CPU groups dynamically change based on performance variables.

According to another embodiment, a data processing engine includes: a system status monitor configured to monitor performance variables of a data processing system; and a dynamic mapper configured to map a plurality of tasks including I/O tasks and compute tasks, a plurality of thread groups in a thread pool, and a plurality of CPU groups in a CPU pool. The plurality of thread groups including one or more I/O handlers and one or more data processors. The dynamic mapper is configured to map each of the plurality of tasks to a thread group of the plurality of thread groups in a thread pool. The dynamic mapper is further configured to map each of the plurality of thread groups in the thread pool to at least one CPU group of the plurality of CPU groups in the CPU pool. The mappings between the plurality of tasks and the plurality of thread groups and between the plurality of thread groups and the plurality of CPU groups dynamically change based on the performance variables.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
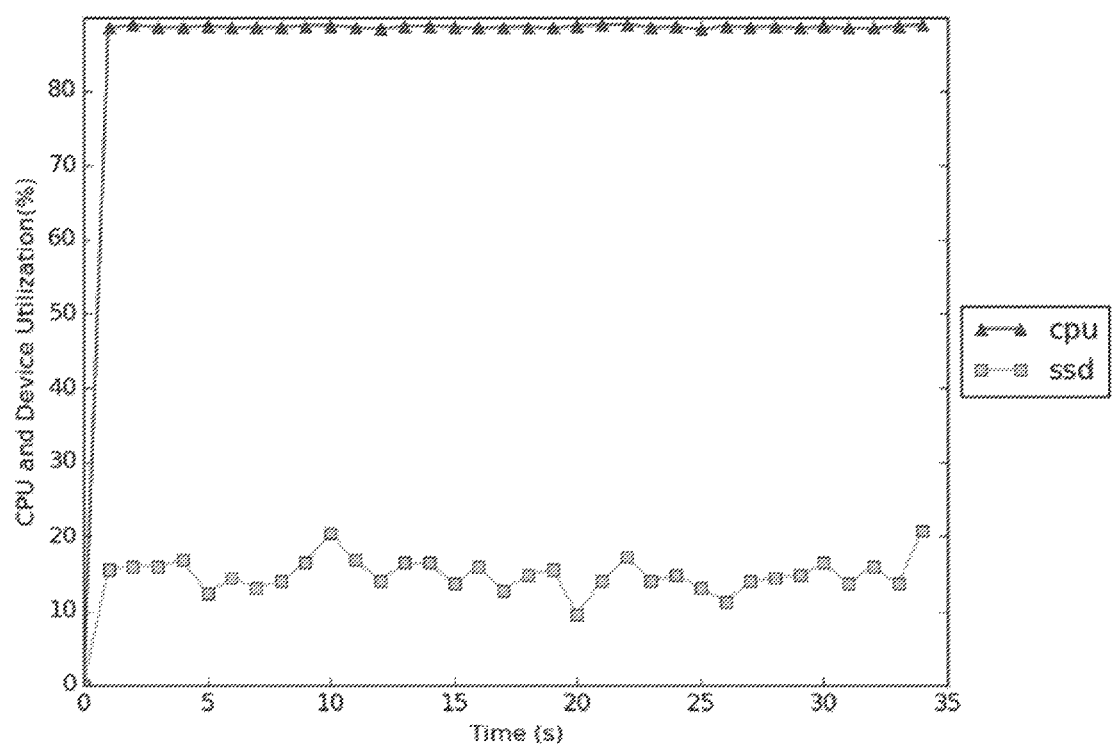
FIG. 1 shows an example of system utilization of an asynchronous data processing application with the on-demand scheme.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for dynamically managing compute and I/O resource in data processing systems. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Traditional resource management schemes of a data processing system do not manually manage tasks, threads, and CPUs, or strictly assign resources for each task. In one embodiment, a task refers to a fragment of code that can be independently processed. The present disclosure provides a new type of resource management scheme to alleviate the aforementioned issues associated with the on-demand policy and the static mapping policy employed by traditional resource management schemes. The present resource management scheme can provide efficient allocation of resources under given workloads and tasks.

The present resource management scheme can dynamically re-map resource assignments to achieve a balanced system resource usage. The present resource management scheme can minimize the resource idle time according to the current status of the system and the characteristics of tasks. More specifically, the present resource management scheme can adjust the mapping between tasks and thread groups, and between the thread groups and CPU groups. In addition, the present resource management scheme can throttle I/O threads to further control the resource usage.

The present resource management scheme can be applied to data processing engines or data storage systems. According to one embodiment, the present resource management scheme can manage two mappings including a first mapping between tasks and threads and a second mapping between the threads and CPU resources. The dynamic resource management scheme can provide a better processing throughput by balancing the CPU resources between the tasks.

According to one embodiment, a data processing engine is provided. The data processing engine can incorporate several core components to provides the mappings between tasks and threads and between the threads and CPU resources. Examples of the core components include, but are not limited to, a system status monitor, a job status monitor, a dynamic mapper, an I/O handler, and a data processor. The system status monitor can monitor system status such as CPU and memory usage and report to the dynamic mapper. The job status monitor can monitor the current status of jobs (e.g., I/O and compute tasks) and report the status of the jobs to the dynamic mapper. The dynamic mapper can determine the mappings based on various system parameters and calculate I/O throttle values when needed. The I/O handler can process I/O asynchronously at the rate of the I/O throttle values as defined by the dynamic mapper, and reschedule the I/O tasks. The data processor can process the data, for example, calculating the data and reading and writing data from and to a data storage medium.

The system resource management schemes can be classified into two types, on-demand assignment and static assignment. The on-demand resource management scheme is good at utilizing CPU resources based on a fair and time-sharing CPU scheduler in a host operating system (OS). FIG. 1 shows an example of system utilization of an asynchronous data processing application with the on-demand scheme. However, the on-demand assignment scheme often creates a high CPU contention between I/O and compute tasks increasing an average latency for executing incoming tasks. The static assignment scheme, on the other hand, is designed to alleviate the CPU contention issues of the on-demand assignment scheme by isolating the resources among incoming tasks.

Figure 2:
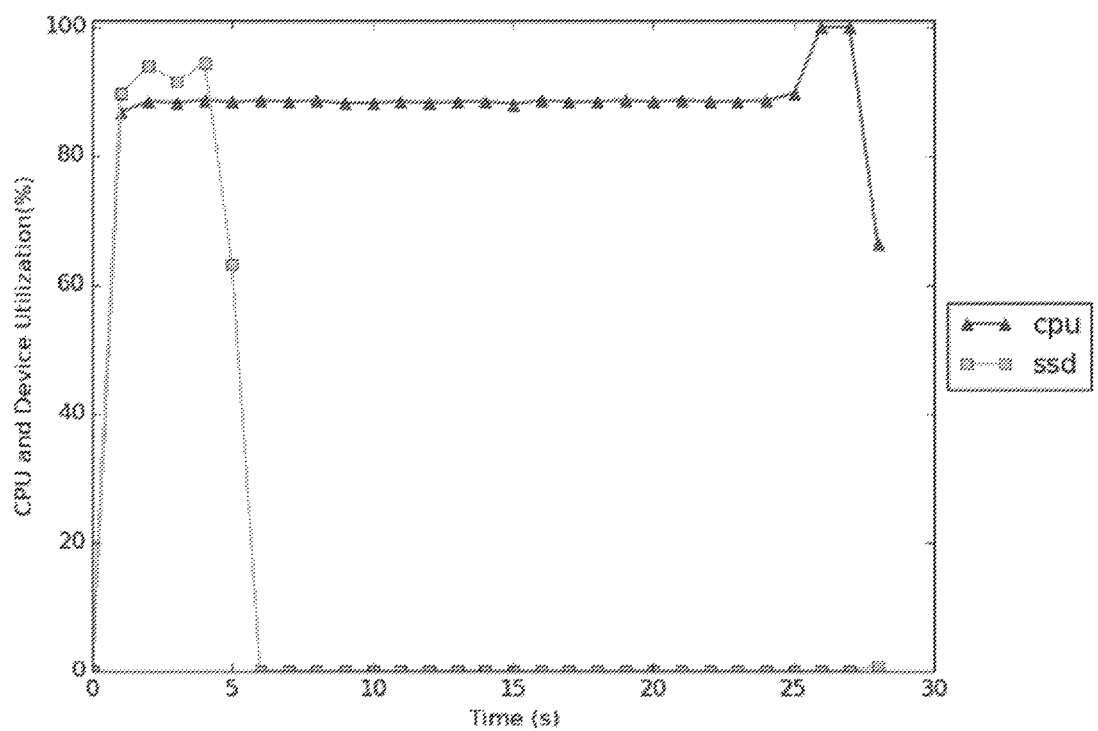
FIG. 2 shows an example of system utilization of an asynchronous data processing application with the static-assignment scheme.

However, the static assignment scheme may introduce inefficiency of resource utilization. For example, an I/O threads and compute threads may compete for the same CPU resources and the CPU resources may not be fully utilized. FIG. 2 shows an example of system utilization of an asynchronous data processing application with the static-assignment scheme. As shown in FIG. 2, the static-assignment scheme can exhibit CPU underutilization by isolating CPU resources on I/O threads. Since each of the I/O threads runs in a separate CPU core, the system utilization shows high I/O throughput when executing the allocated I/O threads, but the CPU cores become idle after completing the allocated tasks. The idling resources for the I/O threads are not utilized by other computing tasks.

The conventional resource allocation schemes can be represented by the relationship between tasks, threads, and computing resources. The present resource management scheme can provide a better processing throughput by managing two separate mappings, i.e., a first mapping between tasks and thread groups and a second mapping between the thread groups and groups of physical CPUs or CPU cores.

Figure 3:
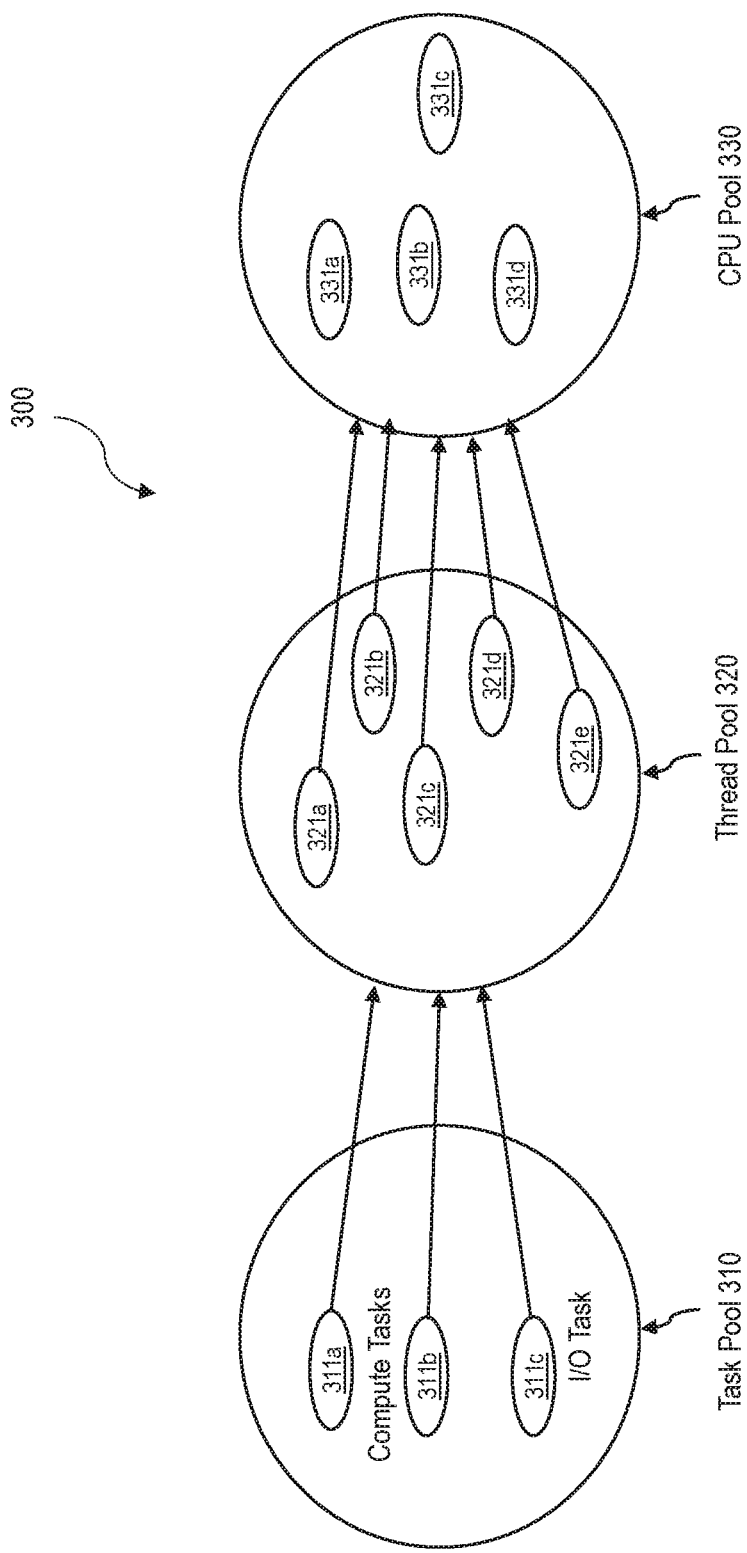
FIG. 3 shown an example mapping in a conventional on-demand scheme.

FIG. 3 shown an example mapping in a conventional on-demand scheme. The on-demand model 300 includes a task pool 310, a thread pool 320, and a CPU pool 330. The task pool 301 includes compute tasks 311a and 311b, and I/O task 311c. The thread pool 320 includes threads 321a-321e. The CPU pool 330 includes CPU cores 331-331d. In the present example, three tasks, five threads, and four CPU cores are shown. However, it is understood that any number of tasks, threads, and CPU cores can be included in the task pool 310, the thread pool 320, and the CPU pool 330.

The on-demand model 300 maintains a thread pool 321 including a pre-defined number of threads, in the present example, threads 321a-321e. When a task (e.g., compute tasks 311a and 311b, and I/O task 311c) comes in, a data processing engine places the task in a queue (e.g., a first-in, first-out (FIFO) buffer) of the task pool 310 and associates the task with one thread 321 from the thread pool 320. The thread 321 may be arbitrarily selected from the thread pool 320 because there is no mapping between a thread and a core. The tasks 311 and the threads 321 are evicted from the task pool 310 and the thread pool 320 respectively in the order they are placed. The data processing system associates a CPU core 331 from the CPU pool 330 to execute the particular thread. The CPU core 331 may be arbitrarily selected from the CPU pool 330 based on the CPU scheduler of the host OS. Without knowing a type of the task, the host OS cannot prioritize threads or tasks or attempt to preserve the performance of a specific thread similar to the I/O thread example shown in FIG. 1.

The CPU scheduler in a host OS can prioritize threads based on a variety of parameters and conditions. For example, a priority of each thread is calculated by its own design goals, for example, maximizing fairness or throughput. When CPU contention occurs, it is difficult to identify and resolve a performance bottleneck because the CPU scheduler does not know how many I/O threads would be needed to saturate the device, thus cannot control the creation or destruction of the I/O threads. As will be discussed below, the present resource management scheme can alleviate CPU contention by dynamically adjusting the number of threads and the mapping between the threads and CPU cores based on the performance characteristics of compute and I/O tasks.

The representative relationships among tasks, threads, and CPU cores can be described in terms of the number of tasks s, and the number of threads t, and the number of CPU cores p. The on-demand model 300 allows any s to be mapped to any t, and any t to be mapped to any p. The mappings of the on-demand model 300 can be represented by:

Tasks:Threads=s:t, and
Threads:CPU cores=t:p.

There are no restrictions on the mappings, so CPU contention is likely to happen according to the on-demand model 300.

Figure 4:
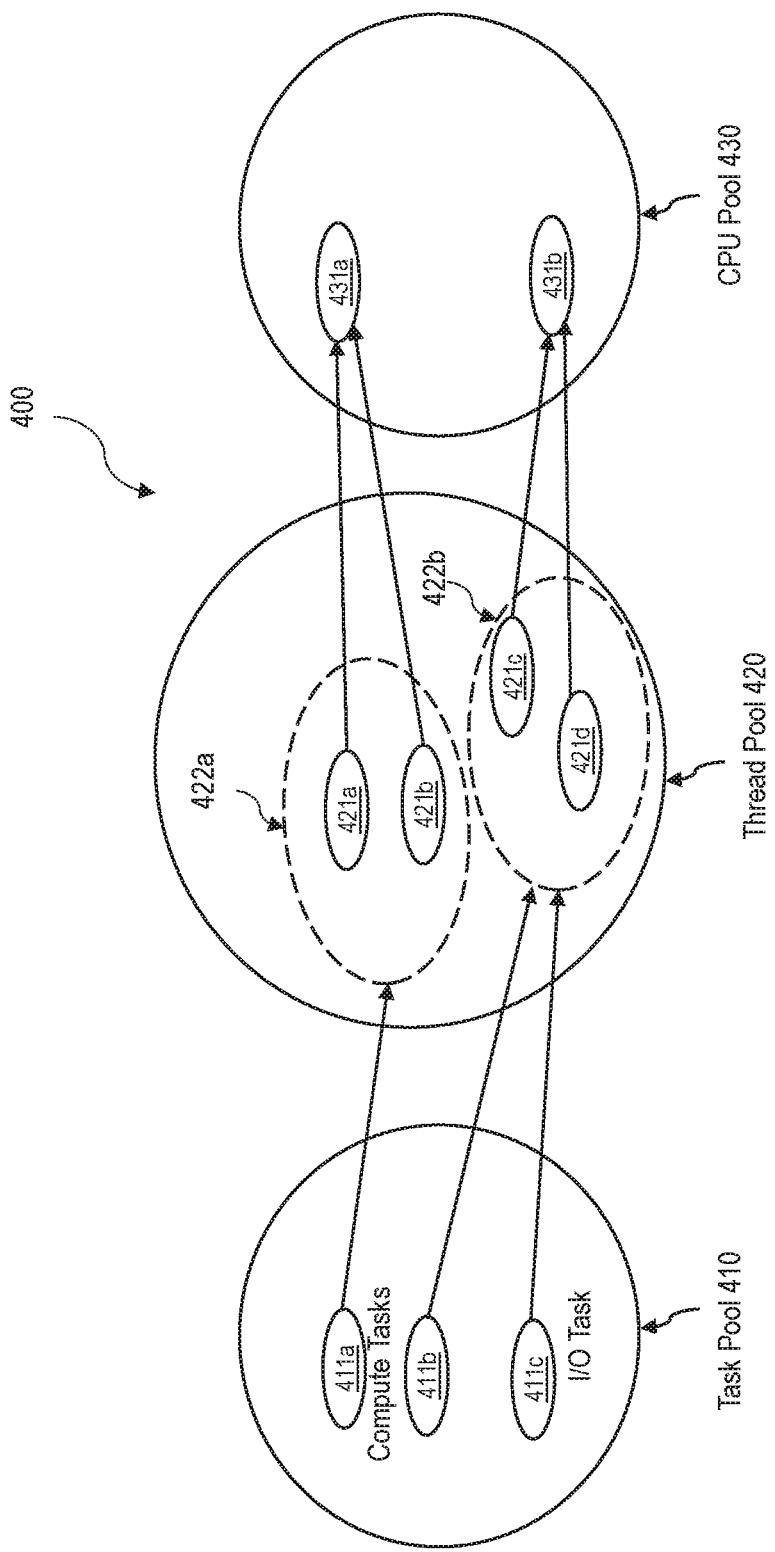
FIG. 4 shows an example mapping in a conventional static-assignment scheme.

FIG. 4 shows an example mapping in a conventional static-assignment scheme. The static-assignment model 400 includes a task pool 410, a thread pool 420, and a CPU pool 430. The task pool 410 includes compute tasks 411a and 411b, and I/O task 411c. The thread pool 420 includes thread 421a-421d. The CPU pool 430 includes CPU cores 431a and 431b. The threads 421a and 421b are grouped together in a thread group 422a, and the threads 421c and 421d are grouped together in a thread group 422b. The numbers of tasks 411, threads 421, and CPU cores 431 included in the task pool 410, the thread pool 420, and the CPU pool 430 are for illustration purposes only, and it is understood that any number of tasks, threads, and CPU cores may exist or allocated in the task pool 410, the thread pool 420, and the CPU pool 430.

The static-assignment scheme 400 isolates the CPU resources for each task 411. A task 411 is associated with one thread group 422 selected from the thread pool 420 that is scheduled to be performed by a specific CPU core 431. The size of thread group 422 can be one. In that case, only one thread 421 can run in each core 431. The single-sized thread group 422 and the association with the single-sized thread group 422 to a single CPU core 431 can minimize CPU contention. However, the static-assignment model 400 can incur an overhead when a certain assigned task 411 does not fully utilize the assigned CPU core 431 as shown in the example of FIG. 2. The mappings of the static-assignment scheme 400 can be represented by:

Tasks:Thread Group=s:1, and
Thread Group:CPU Group=1:1.

Each CPU core 431 has a fixed number of pre-assigned threads 421 in a thread group 422, and a task 411 is mapped to the thread group 422.

Figure 5:
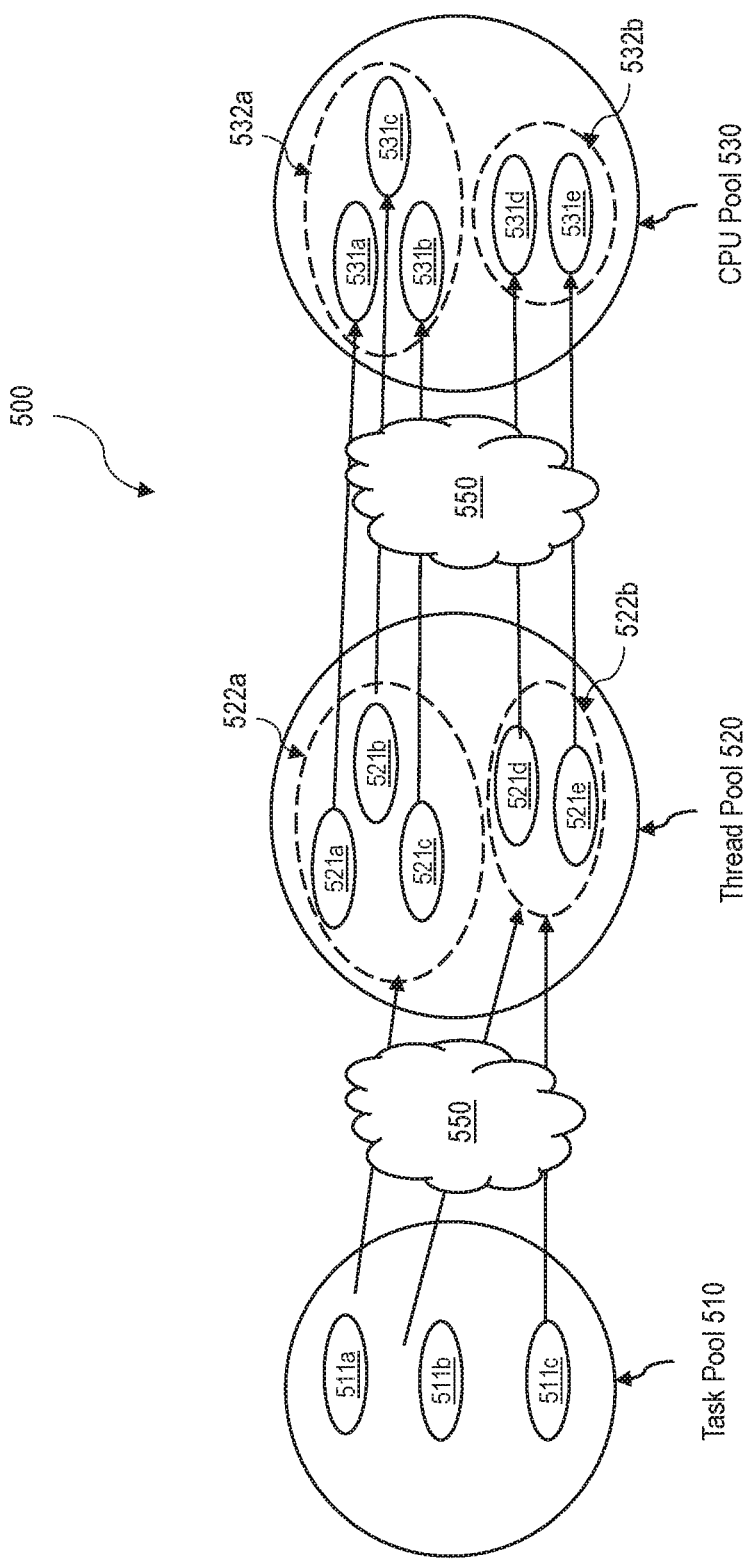
FIG. 5 shows an example dynamic mapping scheme, according to one embodiment.

According to one embodiment, a dynamic mapping scheme is used to alleviate the issues with the on-demand model 300 of FIG. 3 and the static assignment model 400 of FIG. 4. FIG. 5 shows an example dynamic mapping scheme, according to one embodiment. The dynamic mapping model 500 includes a task pool 510, a thread pool 520, and a CPU pool 530. The task pool 510 contains a plurality of tasks 511. The thread pool 520 contains a plurality of threads 521 grouped in a plurality of thread groups 522. The CPU pool 530 contains a plurality of CPU cores 531 grouped in a plurality of CPU groups 532.

A dynamic mapper 550 can map a plurality of tasks 511 to a thread group 522 in the thread pool 520. According to one embodiment, a mixture of I/O tasks and CPU tasks can be mapped to the same thread group 522. The dynamic mapper 550 can also map the thread groups 522 in the thread pool 520 to a CPU group 532 in the CPU pool 530. The ratio of the thread groups 522 and the CPU groups 532 may not be 1:1.

The dynamic mapper 550 can change mappings between tasks 511 and thread groups 522, and between thread groups 522 and CPU groups 532 based on various parameters. Examples of such parameters include, but are not limited to, the characteristics of tasks 511, a system status (e.g., CPU and disk utilization), and a job status (e.g., number of remaining tasks) of the system. The mappings of the present dynamic mapping model 500 can be represented by:

Tasks:Thread Groups=s:1, and

Thread Groups:CPU Groups=T:P.

The number of thread groups T and the number of CPU groups P may be the same or different. For example, the number of thread groups T is greater than the number of CPU groups P, or the number of CPU groups P is greater than the number of thread groups T.

The dynamic mapping model 500 can reassign the mappings between tasks 511 and thread groups 522, and between thread groups 522 and CPU groups 532 when the operating system determines that a certain resource is starting to be underutilized. For example, in case of FIG. 2, the CPU groups for I/O threads can be remapped to compute threads when a system status monitor and/or a job status monitor of the data processing engine detects underutilization of the CPU groups for the I/O threads after 6 seconds. If there exists a compute thread waiting for I/O threads to be completed, the dynamic mapper of the data processing engine can assign more CPU groups or reduce the I/O throttle values for the I/O threads by increasing the priority of the I/O threads.

An I/O task can be a high priority I/O task and a low priority I/O task. A high priority I/O task can be serviced sooner than a previously dispatched lower priority I/O task. The data processing system can maintain the priority level of the I/O tasks. In one embodiment, low priority I/O tasks can be throttled to a predetermined I/O rate (i.e., at an I/O processing rate) such that the low priority I/O tasks are not starved of CPU resources. However, the low priority tasks can affect the I/O throughput of the data processing system, but at least the I/O rate of the low priority I/O tasks can deterministically control the I/O throughput of the data processing system.

Figure 6:
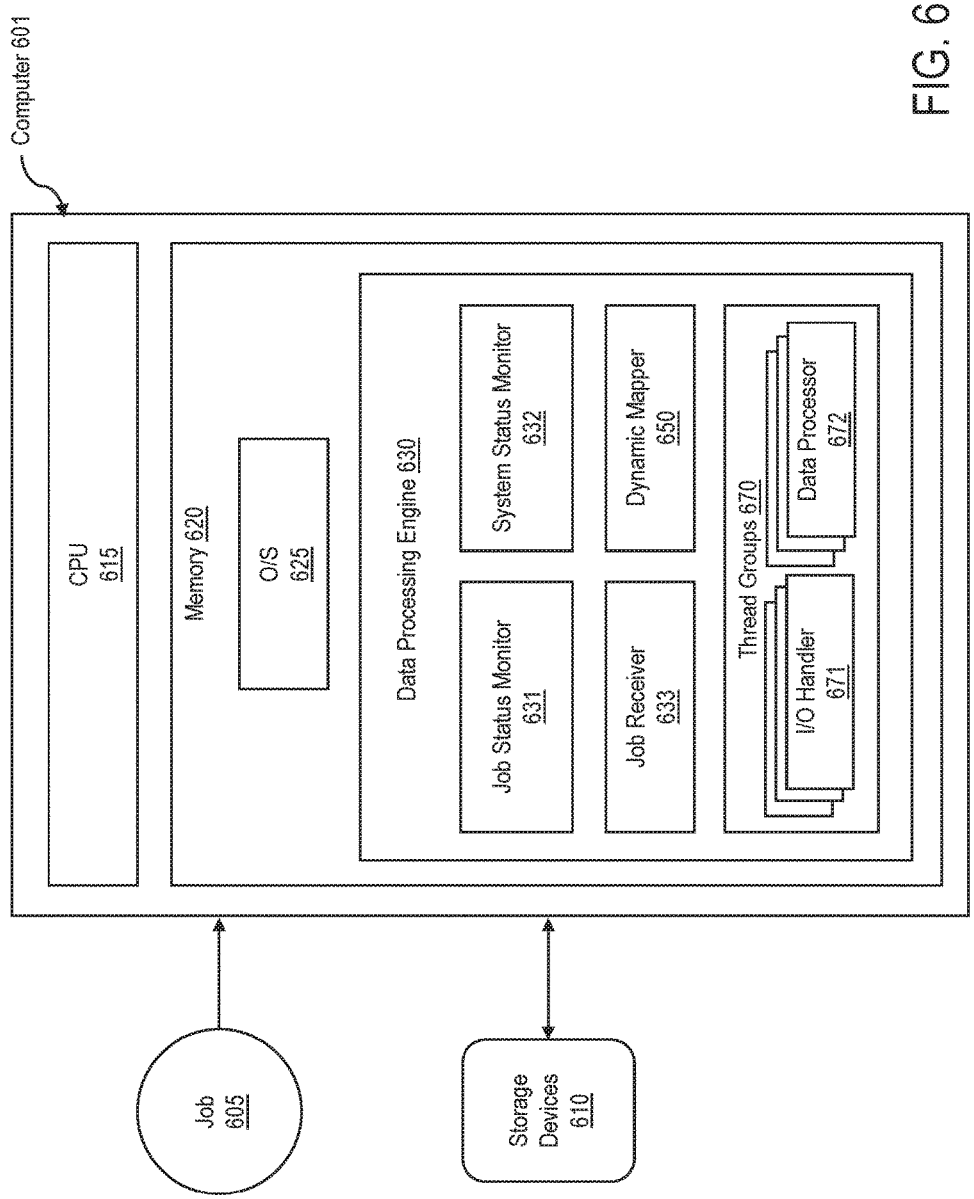
FIG. 6 illustrates a block diagram of an example data processing engine, according to one embodiment.

FIG. 6 illustrates a block diagram of an example data processing engine, according to one embodiment. A host computer 601 includes a CPU 615 including one or more CPU cores and a memory 620. Although only one CPU 615 is shown in FIG. 6, it is understood that the host computer 610 can have multiple CPUs, and each of the CPUs can include one or more CPU cores without deviating from the scope of the present disclosure. The memory 620 includes an operating system 625 and a data processing engine 630. The data processing engine 630 includes various modules including, but not limited to, a job status monitor 631, a system status monitor 632, a job receiver 633, and a dynamic mapper 650. The data processing engine 630 further includes thread groups 670 including I/O handlers 671 and data processors 672. Both the I/O handlers 671 and data processors 672 can represent threads and processing I/O requests and data respectively.

The host computer 601 can receive job requests 605 and communicate with data storage devices 610 such as solid-state drives (SSDs) and hard disk drives (HDDs). The job requests 605 can be generated by a process running locally, or generated externally and received from a client via a network communication channel such as Transmission Control Protocol/Internet Protocol (TCP/IP) and Remote Direct Memory Access (RDMA). Compared to a conventional data processing engine, the data processing engine 630 provides the system status monitor 632, the dynamic handler 650, and the I/O handlers 671, and data processors 672 that are newly introduced or modified.

The dynamic mapper 650 can determine the mapping between application tasks and tread groups and between thread groups and CPU groups. The dynamic mapper 650 can also calculate throttle I/Os for the shared use of CPU resources. The system status monitor 632 can collect various system performance variables, such as the status of the CPU 615 and the memory 620, network and disk utilization, and the number of CPU-hungry processes. The system status monitor 632 can be implemented using existing system utilities such as sar, hdparm, top, and other utilities to collect the system performance variables. The job status monitor 631 can monitor, collect, and report the status of jobs, such as the number of tasks processed, and the number of pending jobs.

Figure 7:
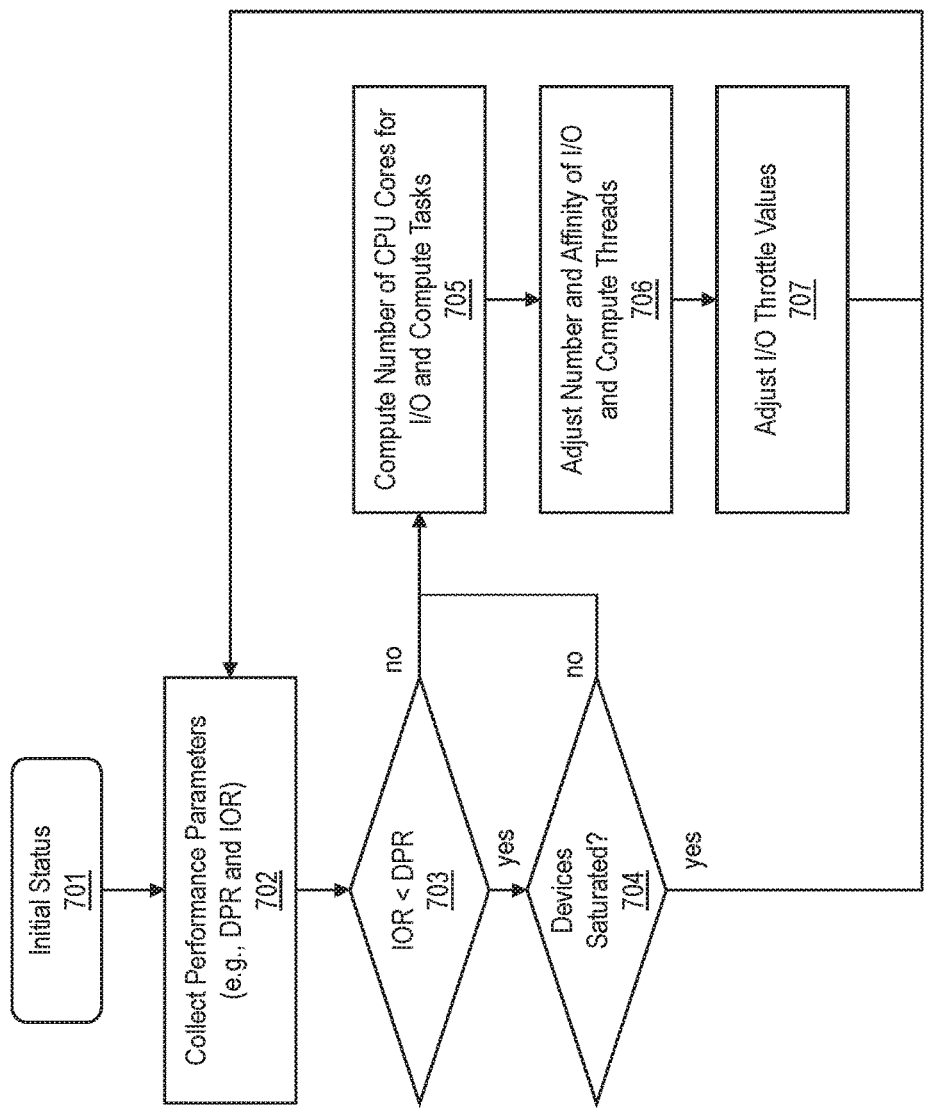
FIG. 7 shows a flowchart of an example dynamic mapper, according to one embodiment.

FIG. 7 shows a flowchart of an example dynamic mapper of a data processing system, according to one embodiment. The dynamic mapper is initialized (701) by validating configuration and verifying accesses to sub components (e.g., a system status monitor) that need to be monitored, and preparing data structure to collect information (e.g., performance parameters), and starting a monitoring thread to start collecting the information. After being initialized, the dynamic mapper starts to collect various performance parameters from a system status monitor (702). Examples of the performance parameters include, but are not limited to, a data processing rate (DPR) and an I/O processing rate (IOR) of CPU cores of the data processing system. The dynamic mapper tries to saturate CPU cores by keeping the IOR as close to the DPR as possible. When the IOR is greater than or equal to the DPR (703), the dynamic mapper computes the number of CPU cores allocated for I/O tasks and compute tasks (705). When the DPR is greater than or equal to the IOR (703), the dynamic mapper checks whether devices (e.g., storage devices 610 of FIG. 6) are saturated (704). A device is saturated when its I/O bandwidth or IOPSs is fully utilized, therefore sending more I/O commands to a saturated device would not give any performance benefit. If the devices are not saturated (704), the dynamic mapper also computes the number of CPU cores allocated for I/O tasks and compute tasks (705). The dynamic mapper adjusts the number of I/O and compute threads and/or affinity of the I/O and compute threads to the CPU groups based on the number of CPU cores allocated for the I/O tasks and the compute tasks (706). For example, the dynamic mapper can increase or decrease the number of threads in a thread group by moving one or more threads from one thread group to another thread group. The dynamic mapper can change the affinity of a thread group to a CPU group by changing the mapping between the thread group to another CPU group. Examples of such performance variables include, but are not limited to, CPU utilization, device utilization, existence of blocking operations, and latency-sensitivity of tasks. The dynamic mapper can further lower the IOR by adjusting I/O throttle values (707), especially when the DPR is lower than the IOR, and an I/O thread shares CPU cores with other compute threads. The processes repeat to continuously balance the CPU resources between I/O tasks and compute tasks based on the performance variables of the data usage. The dynamic mapper can be implemented as a process or a thread of the host operating system.

Figure 8:
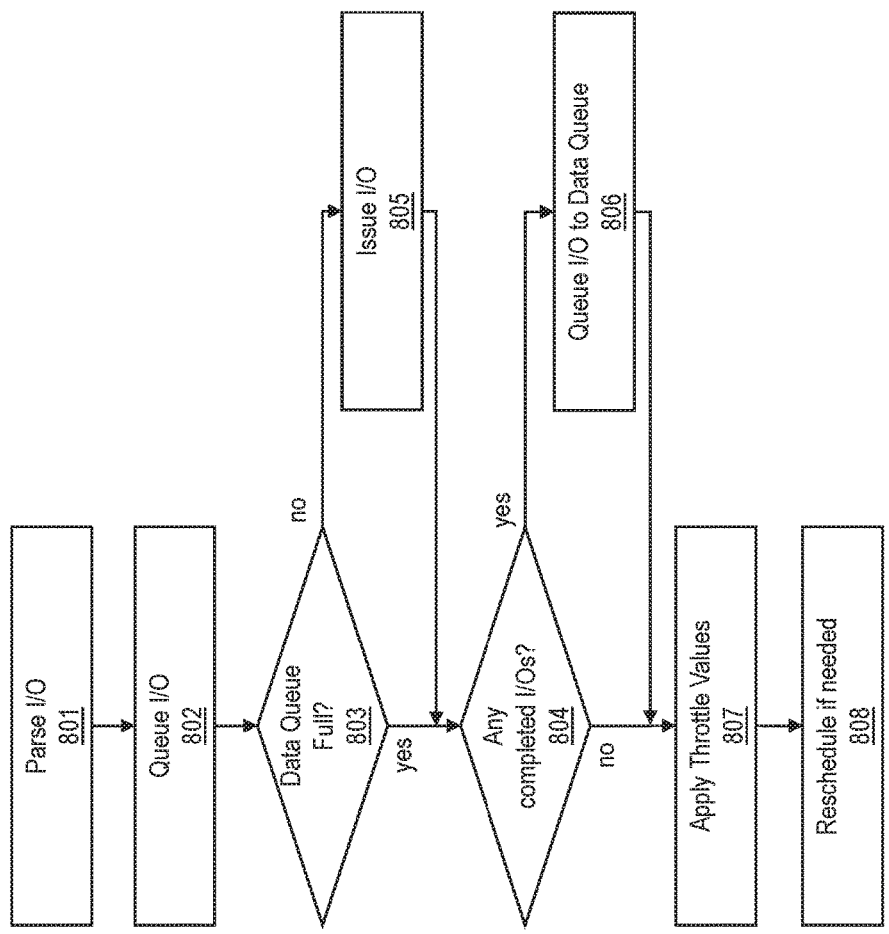
FIG. 8 shows a flowchart of an example I/O handler, according to one embodiment.

FIG. 8 shows a flowchart of an example I/O handler, according to one embodiment. The I/O handler can process I/O requests asynchronously for higher I/O performance for a data processing system. In one embodiment, the data processing system includes an I/O queue for processing the I/O tasks and a data queue for processing the compute tasks. The I/O handler parses an I/O task (801) and queues the parsed I/O task in the I/O queue (802). The I/O handler checks whether a data queue is full (803). If the data queue is not full, the I/O handler issues the I/O task (805) and checks if the data queue has any completed I/O tasks (804). If the data queue is full, the I/O handler checks whether the data queue has any completed I/O tasks (804). If the data queue includes any completed I/O tasks (804), the I/O handler queues the I/O task to the data queue (806). If the data queue does not have any completed I/O tasks or after queuing the completed I/O tasks to the data queue, the I/O handler applies throttle values (807) and reschedule the I/O task if the mapping of the I/O task is changed (808). The I/O handler applies throttle values when too much resource is assigned to an I/O task. The number of I/O tasks may be reduced to one, but its IOR may still be higher than DPR. In this case, the I/O handler further reduces the CPU consumption of I/O tasks by entering into a sleep mode for a predetermined period of time at a certain frequency. In one embodiment, the frequency and amount of sleep time are referred to as throttle values. The throttle values can be calculated based on the current IOR and DPR to balance the IOR and DRP. After the calculation, the I/O handler can apply new throttle values to an I/O task if the throttle values are greater than 0.

The application of the throttle values in 807 can be applied in a shared mode. For example, the I/O handler can adjust the sleep time and queue depth based on the throttle values set by the I/O monitor. The rescheduling of I/O tasks in 808 can be used in a dedicated mode. The rescheduling can occur when an I/O monitor changes the CPU affinity for the I/O handlers.

Figure 9:
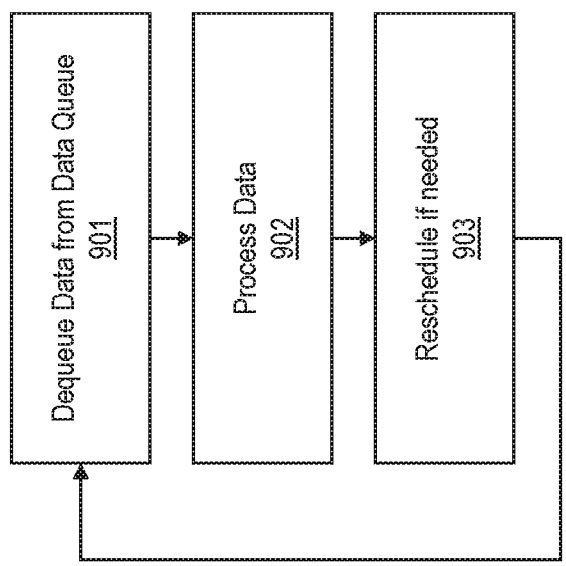
FIG. 9 shows a flowchart of an example data processor, according to one embodiment.

FIG. 9 shows a flowchart of an example data processor, according to one embodiment. The data processor dequeues data for a compute task from the data queue (901) and processes the data at the DPR (902). The data processor may reschedule the compute task (903), for example, if the mapping of the compute task is changed to a different thread group or the thread group to which the compute task is mapped is mapped to a different CPU group. The data processor can go sleep during processing the data due to blocking operations. The data processor may reschedule the compute task when an I/O monitor changes the CPU affinity for the data processor.

The present disclosure describes a dynamic mapping scheme that can dynamically balance CPU resources between I/O tasks and compute tasks in a data processing system based on the current system resource usage. The present dynamic mapping can adjust the mapping between physical CPU cores and threads, adjust the mappings between application tasks and threads. The present dynamic mapping scheme can adjust the priority of the background I/O threads and tune the number of threads for each different type of tasks for better data processing throughput. The present dynamic mapping scheme for mapping tasks to thread groups and thread groups to CPU groups can be applied to any server applications where there are multiple concurrent tasks with different priorities or dependencies such as I/O and computation.

According to one embodiment, a method includes: providing a thread pool including a plurality of thread groups, each thread group including one or more threads; providing a CPU pool including a plurality of CPU groups, each CPU group including one or more CPU cores; receiving a plurality of tasks including I/O tasks and compute tasks; mapping each of the plurality of tasks to at least one thread group in the thread pool; and mapping each of the plurality of thread groups in the thread pool to at least one CPU group in the CPU pool. The mappings between the plurality of tasks and the plurality of thread groups and between the plurality of thread groups and the plurality of CPU groups dynamically change based on performance variables.

The performance variables may include one or more of CPU utilization, device utilization, existence of blocking operations, and latency-sensitivity of tasks.

The one or more I/O tasks and one or more compute tasks may be mapped to a same thread group.

The method may further include: receiving performance parameters including a data processing rate (DPR) and an I/O processing rate (IOR) of CPU cores of a data processing system; and adjusting mappings between the plurality of tasks and the thread groups and between the thread groups and the CPU groups when the IOR is greater than the DPR.

The method may further include: computing a number of CPU cores allocated for the I/O tasks and the compute tasks; and adjusting a number of the thread groups and affinity of the thread groups to the CPU groups based on the number of CPU cores allocated for the I/O tasks and the compute tasks.

The method may further include increasing or decreasing a number of threads in a thread group by moving threads from a first thread group to a second thread group.

The method may further include changing the affinity of a thread group to a first CPU group by changing the mapping between the thread group to a second CPU group.

The method may further include adjusting I/O throttle values to balance the IOR and the DPR.

The method may further include: providing an I/O queue for processing the I/O tasks and a data queue for processing the compute tasks; parsing an I/O task and queueing the parsed I/O task in the I/O queue; issuing the I/O task if the data queue is not full; and queuing the I/O task to the data queue if the data queue has a completed I/O task.

The method may further include: applying throttle values; and rescheduling the I/O task.

The method may further include: dequeuing data for a compute task from the data queue; processing the data at the DPR; and rescheduling the compute task if a mapping of the compute task is changed.

According to another embodiment, a data processing engine includes: a system status monitor configured to monitor performance variables of a data processing system; and a dynamic mapper configured to map a plurality of tasks including I/O tasks and compute tasks, a plurality of thread groups in a thread pool, and a plurality of CPU groups in a CPU pool. The plurality of thread groups including one or more I/O handlers and one or more data processors. The dynamic mapper is configured to map each of the plurality of tasks to a thread group of the plurality of thread groups in a thread pool. The dynamic mapper is further configured to map each of the plurality of thread groups in the thread pool to at least one CPU group of the plurality of CPU groups in the CPU pool. The mappings between the plurality of tasks and the plurality of thread groups and between the plurality of thread groups and the plurality of CPU groups dynamically change based on the performance variables.

The performance variables may include one or more of CPU utilization, device utilization, existence of blocking operations, and latency-sensitivity of tasks.

The dynamic mapper may map one or more I/O tasks and one or more compute tasks to a same thread group.

The dynamic mapper may be further configured to: receive performance parameters including a data processing rate (DPR) and an I/O processing rate (IOR) of CPU cores of a data processing system; and adjust mappings between the plurality of tasks and the thread groups and between the thread groups and the CPU groups when the IOR is greater than the DPR.

The dynamic mapper may be further configured to: compute a number of CPU cores allocated for the I/O tasks and the compute tasks; and adjust a number of the thread groups and affinity of the thread groups to the CPU groups based on the number of CPU cores allocated for the I/O tasks and the compute tasks.

The dynamic mapper may be further configured to adjust I/O throttle values to balance the IOR and the DPR.

Each of the I/O handlers may be configured to: provide an I/O queue for processing the I/O tasks and a data queue for processing the compute tasks; parse an I/O task and queueing the parsed I/O task in the I/O queue; issue the I/O task if the data queue is not full; and queue the I/O task to the data queue if the data queue has a completed I/O task.

Each of the I/O handlers may be further configured to: apply throttle values; and reschedule the I/O task.

Each of the data processors may be configured to: dequeue data for a compute task from the data queue; process the data at the DPR; and reschedule the compute task if a mapping of the compute task is changed.

The above example embodiments have been described hereinabove to illustrate various embodiments of implementing a system and method for dynamically managing compute and I/O resource in data processing systems. Various modifications and departures from the disclosed example embodiments will occur to those having ordinary skill in the art. The subject matter that is intended to be within the scope of the invention is set forth in the following claims.

What is claimed is:

1. A method comprising:
providing a thread pool including a plurality of thread groups, each thread group including one or more threads;
providing a CPU pool including a plurality of CPU groups, each CPU group including a plurality of physical CPUs, and each physical CPU including one or more CPU cores;
receiving a plurality of tasks including I/O tasks and compute tasks;
mapping each of the plurality of tasks to at least one thread group in the thread pool; and
mapping each of the plurality of thread groups in the thread pool to at least one CPU group in the CPU pool;
receiving performance parameters including a data processing rate (DPR) and an I/O processing rate (IOR) of CPU cores of a data processing system;
monitoring the performance parameters including utilization of the plurality of CPU groups as the I/O tasks and the compute tasks are executed;
comparing performance of the I/O tasks and the compute tasks running on the plurality of CPU cores;
dynamically changing the mappings between the plurality of tasks and the plurality of thread groups and between the plurality of thread groups and the plurality of CPU groups based on the performance parameters to balance the performance between the I/O tasks and compute tasks; and
adjusting the mappings between the plurality of tasks and the plurality of thread groups and between the plurality of thread groups and the plurality of CPU groups when the IOR is greater than the DPR.

2. The method of claim 1, wherein the performance parameters further include saturation of one or more storage devices, existence of blocking operations, and latency-sensitivity of tasks.

3. The method of claim 1, wherein one or more I/O tasks and one or more compute tasks are mapped to a same thread group.

4. The method of claim 1, further comprising:
computing a number of CPU cores allocated for the I/O tasks and the compute tasks;
adjusting a number of the thread groups and affinity of the thread groups to the CPU groups based on the number of CPU cores allocated for the I/O tasks and the compute tasks.

5. The method of claim 4, further comprising increasing or decreasing a number of threads in a thread group by moving threads from a first thread group to a second thread group.

6. The method of claim 4, further comprising changing the affinity of a thread group to a first CPU group by changing the mapping between the thread group to a second CPU group.

7. The method of claim 1, further comprising adjusting 1/0 throttle values to balance the IOR and the DPR.

8. A method comprising:
providing a thread pool including a plurality of thread groups, each thread group including one or more threads;
providing a CPU pool including a plurality of CPU groups, each CPU group including a plurality of physical CPUs, and each physical CPU including one or more CPU cores;
receiving a plurality of tasks including I/O tasks and compute tasks;
mapping each of the plurality of tasks to at least one thread group in the thread pool;
and
mapping each of the plurality of thread groups in the thread pool to at least one CPU group in the CPU pool;
monitoring performance parameters including utilization of the plurality of CPU groups as the I/O tasks and the compute tasks are executed;
comparing performance of the I/O tasks and the compute tasks running on the plurality of CPU cores;
dynamically changing the mappings between the plurality of tasks and the plurality of thread groups and between the plurality of thread groups and the plurality of CPU groups based on the performance parameters to balance the performance between the I/O tasks and compute tasks:
providing an I/O queue for processing the I/O tasks and a data queue for processing the compute tasks;
parsing an I/O task and queueing the parsed 1/0 task in the 1/0 queue;
issuing the I/O task if the data queue is not full; and
queuing the I/O task to the data queue if the data queue has a completed I/O task.

9. The method of claim 8, further comprising:
applying throttle values; and
rescheduling the I/O task.

10. The method of claim 8, further comprising:
dequeuing data for a compute task from the data queue;
processing the data at the DPR; and
rescheduling the compute task if a mapping of the compute task is changed.

11. A data processing engine comprising:
a system status monitor configured to monitor performance parameters of a data processing system;
a dynamic mapper configured to map a plurality of tasks including I/O tasks and compute tasks, a plurality of thread groups in a thread pool, and a plurality of CPU groups in a CPU pool, each CPU group including a plurality of physical CPUs, and each physical CPU including one or more CPU cores,
wherein the plurality of thread groups including one or more I/O handlers and one or more data processors,
wherein the dynamic mapper is configured to map each of the plurality of tasks to a thread group of the plurality of thread groups in a thread pool, wherein the dynamic mapper is further configured to map each of the plurality of thread groups in the thread pool to at least one CPU group of the plurality of CPU groups in the CPU pool,
wherein the system status monitor is configured to monitor performance parameters including utilization of the plurality of CPU groups as the I/O tasks and the compute tasks are
executed and compare performance of the I/O tasks and the compute tasks running on the plurality of CPU cores, and
wherein the dynamic mapper is further configured to:
dynamically change the mappings between the plurality of tasks and the plurality of thread groups and between the plurality of thread groups and the plurality of CPU groups based on the performance parameters to balance the performance between the I/O tasks and compute tasks;
receive the performance parameters including a data processing rate (DPR) and an I/O processing rate (IOR) of CPU cores of a data processing system; and
adjust mappings between the plurality of tasks and the plurality of thread groups and between the plurality of thread groups and the plurality of CPU groups when the IOR is greater than the DPR.

12. The data processing engine of claim 11, wherein the performance parameters further include saturation of one or more storage devices of the data processing system, existence of blocking operations, and latency-sensitivity of tasks.

13. The data processing engine of claim 11, wherein the dynamic mapper maps one or more I/O tasks and one or more compute tasks to a same thread group.

14. The data processing engine of claim 11, wherein the dynamic mapper is further configured to:
compute a number of CPU cores allocated for the I/O tasks and the compute tasks; and
adjust a number of the thread groups and affinity of the thread groups to the CPU groups based on the number of CPU cores allocated for the I/O tasks and the compute tasks.

15. The data processing engine of claim 11, wherein the dynamic mapper is further configured to adjusting I/O throttle values to balance the IOR and the DPR.

16. The data processing engine of claim 11, wherein each of the I/O handlers is configured to:
provide an I/O queue for processing the I/O tasks and a data queue for processing the compute tasks;
parse an I/O task and queueing the parsed I/O task in the I/O queue;
issue the I/O task if the data queue is not full; and
queue the I/O task to the data queue if the data queue has a completed I/O task.

17. The data processing engine of claim 16, wherein each of the I/O handlers is further configured to: apply throttle values; and reschedule the I/O task.

18. The data processing engine of claim 11, wherein each of the data processors is configured to:
dequeue data for a compute task from the data queue;
process the data at the DPR; and
reschedule the compute task if a mapping of the compute task is changed.

* * * * *